(12) United States Patent
Frese et al.

(10) Patent No.: US 7,547,739 B2
(45) Date of Patent: Jun. 16, 2009

(54) POWDER COATING COMPOSITION PROVIDING LOW GLOSS

(75) Inventors: Peter Frese, Landshut (DE); Phu Qui Nguyen, Moenchengladbach (DE); Carmen Flosbach, Wuppertal (DE); Franziska Isele, Erding (DE); Mike Schneider, Langenbach (DE); Karina Fuhrmann, Essenbach (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 295 days.

(21) Appl. No.: 11/641,521

(22) Filed: Dec. 19, 2006

(65) Prior Publication Data

US 2007/0161743 A1 Jul. 12, 2007

Related U.S. Application Data

(60) Provisional application No. 60/751,813, filed on Dec. 20, 2005.

(51) Int. Cl.
*C08L 91/06* (2006.01)
*B32B 27/28* (2006.01)
*B32B 27/40* (2006.01)

(52) U.S. Cl. ............... 524/487; 524/399; 524/602; 524/904; 428/424.4; 428/425.8; 428/522

(58) Field of Classification Search .......... 524/487, 524/904, 399, 602; 428/424.4, 425.8, 522
See application file for complete search history.

(56) References Cited

U.S. PATENT DOCUMENTS

| 3,842,035 | A | 10/1974 | Klaren et al. |
| 4,091,048 | A | 5/1978 | Labana et al. |
| 4,091,049 | A | 5/1978 | Labana et al. |
| 4,374,954 | A | 2/1983 | Labana et al. |
| 6,277,917 | B1 | 8/2001 | Jurgetz et al. |
| 2003/0134978 | A1 | 7/2003 | Tullos et al. |
| 2003/0176558 | A1* | 9/2003 | Care et al. ............ 524/487 |

FOREIGN PATENT DOCUMENTS

| DE | 2247779 | | 4/1973 |
| DE | 19534432 | A1 | 3/1997 |
| DE | 19837601 | A1 | 8/1999 |
| EP | 0551734 | A1 | 7/1993 |
| EP | 0706834 | A1 | 4/1996 |
| EP | 0947254 | A2 | 10/1999 |
| EP | 1129788 | A2 | 9/2001 |
| WO | WO0244289 | A2 | 6/2002 |
| WO | WO03/070826 | A1 | 8/2003 |
| WO | WO 03/102048 | A1 | 12/2003 |

OTHER PUBLICATIONS

D.A. Bates, The Science of Powder Coatings, vols. 1 & 2, Gardiner House, London, 1990, pp. 62-70.
The PCT International Search Report and the Written Opinion of the International Searching Authority, No. PCT/US2006/048588, mailed Sep. 19, 2007.
Copending U.S. Appl. No. 60/751,858, filed Dec. 20, 2005.

* cited by examiner

Primary Examiner—Peter Szekely

(57) ABSTRACT

The present invention provides a powder coating composition comprising
A) 30 to 90 wt % of at least one glycidyl-functionalized (meth)acrylic resin,
B) 30 to 90 wt % of at least one carboxyl functionalized polyurethane resin,
C) 0.01 to 10 wt % of at least one wax, and
D) 0.05 to 30 wt % of at least one coating additive, and optionally pigment and/or filler,
the wt % based on the total weight of the powder coating composition; the powder coating composition provides coatings with a very low gloss level (highly matt finish) and smoothness, a superior durability against aggressive substances and a very good adhesion on metallic substrates.

10 Claims, No Drawings

POWDER COATING COMPOSITION PROVIDING LOW GLOSS

CROSS-REFERENCE TO RELATED APPLICATION

This application claims the benefit of U.S. Provisional Application Ser. No. 60/751,813 filed on Dec. 20, 2005 which is hereby incorporated by references in its entirety.

FIELD OF THE INVENTION

The present invention is directed to a powder coating composition providing a low gloss coating with improved durability as well as improved adhesion on metallic substrates.

DESCRIPTION OF PRIOR ART

In certain applications, it is desirable for powder coatings to have a surface that is smooth in appearance, but has a low gloss or shine. Gloss-control and, especially, matting of powder coatings and keeping these superior technology properties of the coating are currently still difficult tasks.

The use of matting agents to adjust the gloss to the desired level is well known, see WO 03/102048, U.S. 2003/0134978, EP-A 1129788 and EP-A 0947254. Examples for such agents are waxes, silica, glass pearls, and crystalline resins. Such compositions often lead to coatings with a loss in technological properties. For example, hydrocarbon and fluorocarbon waxes are used to reduce the gloss of powder coatings. As a wax-containing coating is baked, the wax migrates to the coating/air interface where it forms a layer with reduced gloss. Shortcomings of this approach are that the wax softens the coating surface and reduces its resistance to marring, staining and chemical attack.

Other techniques for forming a matting effect are the use of dry-blends of chemically incompatible powders or the use of different process conditions, such as, different curing conditions, as, e.g., described in EP-A 0706834, DE-A 2247779 and W0200244289.

EP-A 551734, U.S. Pat. Nos. 4,374,954, 4,091,049 and 4,091,048 describe powder coating compositions which are based on glycidyl group containing acrylate resins and dicarboxylic acids or their anhydrides as hardeners, and which are suitable for coating of aluminum substrates, by partially use of adhesion agents.

Variations of this approach are widely used. A shortcoming of this approach is that coating properties, such as, impact resistance or chemical resistance suffer.

SUMMARY OF THE INVENTION

The present invention provides a powder coating composition comprising
A) 30 to 90 wt % of at least one glycidyl-functionalised (meth)acrylic resin,
B) 30 to 90 wt % of at least one carboxyl functionalised polyurethane resin,
C) 0.01 to 10 wt % of at least one wax, and
D) 0.05 to 30 wt % of at least one coating additive, and optionally, pigment and/or filler,
the wt % based on the total weight of the powder coating composition.

The powder coating composition of this invention may provide coatings with a very low gloss level (highly matt finish) and smoothness. Surprisingly, the powder coating composition of this invention furthermore provides coatings having a superior durability against aggressive substances, such as, inorganic acids as well as a very good yellowing resistance. The adhesion on metallic substrates, for example aluminum substrates is highly improved. The compositions of this invention are especially suitable for outdoor coatings.

DETAILED DESCRIPTION OF THE INVENTION

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

Slight variations above and below the stated ranges specified in this application can be used to achieve substantially the same results as values within the ranges. Also, the disclosure of these ranges is intended as a continuous range including every value between the minimum and maximum values.

All patents, patent applications and publications referred to herein are incorporated by reference in their entirety.

The powder coating compositions of this invention contain one or more glycidyl-functionalised (meth)acrylic resins A) as the principal binder resin with quantities in the range of 30 to 90 wt %, preferred 40 to 70 wt %.

(Meth)acrylic is respectively intended to mean acrylic and/or methacrylic.

The glycidyl-functionalised (meth)acrylic resins may be produced in a conventional manner from glycidyl (meth) acrylic monomers, as is, for example, described in D. A. Bates, The Science of Powder Coatings, volumes 1 & 2, Gardiner House, London, 1990, pages 62-70, and as known by the person skilled in the art.

Examples of glycidyl-functionalised (meth)acrylic resins are glycidyl functionalised acrylic resins or copolymers therefrom, such as, for example, WorléeCryl® CP 550 (Worlee Chemie GbmH), Almatex® PD 7610®, Almatex® PD 7690 (Siber Hegner GmbH), Synthacryl®710 (Cytec Surface Specialties).

The glycidyl-functionalised (meth)acrylic resins have an epoxide equivalent weight (EEW) in a range of 300 to 2000, epoxy equivalent weight determined by means of ADSAM 142, a method code of the EEW test using auto-tritator (Brinkman Metrohm 751 GPD Titrino) and known by a person skilled in the art, and a glass transition temperature Tg in a range of, e.g., 30 to 80° C., preferably 40 to 70 Tg determined by means of differential scanning calorimetry (DSC).

Preferred for this invention are glycidyl functionalised acrylic resins with an EEW in the range of 400 to 800.

The glycidyl-functionalised (meth)acrylic resins may be partially replaced by further resins such as, for example, diglycidyl ethers of bisphenol, epoxy novolak and other resins containing epoxy groups, in quantities in the range of lower than 10 wt %, based on the total weight of the powder coating composition.

As hardener, the powder coating composition of this invention contain one or more carboxyl functionalised polyurethane resin B) as curing agent (cross-linking agent) with quantities in the range of 30 to 90 wt %, preferred 40 to 70 wt %. These are carboxyl functionalised polyurethane resins which are preferably solid at room temperature.

The carboxyl functionalised polyurethane resins may be produced by, for example, reacting hydroxyl functionalised polyurethanes with acid anhydrides. Furthermore, the carboxyl functionalised polyurethane resins may be produced by reacting diisocyanates or polyisocynates or isocyanate functionalised pre-polymers with hydroxyl carboxyl acids.

The hydroxyl functionalised polyurethanes may be prepared in a conventional manner as known to the person skilled in the art. In particular, they may be produced by reacting polyisocyanates with polyols in the excess. Polyols suitable for the production of the polyurethanes are not only polyols in the form of low molar mass compounds defined by empirical and structural formulas but also oligomeric or polymeric polyols with number-average molar masses of, for example, up to 800, for example, corresponding hydroxyl-functional polyethers, polyesters or polycarbonates; low molar mass polyols defined by an empirical and structural formula are, however, preferred.

Examples of useful polyols are the following diols: ethylene glycol, the isomeric propane- and butanediols, 1,5-pentanediol, 1,6-hexanediol, 1,10-decanediol, 1,12-dodecanediol, neopentyl glycol, butylethylpropanediol, the isomeric cyclohexanediols, the isomeric cyclohexanedimethanols, hydrogenated bisphenol A, tricyclodecanedimethanol, and dimer fatty alcohol as representatives of (cyclo)aliphatic diols defined by empirical and structural formula with a low molar mass in the range of 62 to 600 as well as telechelic (meth)acrylic polymer diols, polyester diols, polyether diols, polycarbonate diols, each with a number-average molar mass of, for example, up to 800 as representatives of oligomeric or polymeric diols. Further examples of polyols are polyesterpolyols, polycarbonatepolyols, polyetherpolyols, polylactone-polyols and/or poly(meth)acrylatepolyols.

Examples of acid anhydrides are anhydrides of maleic acid, succinic acid, tetrahydro phthalic acid, hexahydro phthalic acid, methyl hexahydro phthalic acid, trimellitic acid, of pyromellitic acid, and citric acid.

Examples of diisocyanates are hexamethylene diisocyanate (HDI), tetramethylxylylene diisocyanate, isophorone diisocyanate, dicyclohexylmethane diisocyanate, cyclohexane diisocyanate, toluylene diisocyanate, and diphenylmethane diisocyanate.

Examples of polyisocyanates are those which contain heteroatoms in the residue linking the isocyanate groups. Examples of these are polyisocyanates which comprise carbodiimide groups, allophanate groups, isocyanurate groups, urethane groups, acylated urea groups or biuret groups. The polyisocyanates have an isocyanate functionality higher than 2, such as, for example, polyisocyanates of the uretidione or isocyanurate type produced by di- and/or trimerization of the diisocyanates stated in the above paragraph. Further examples are polyisocyanates containing biuret groups produced by reaction of the diisocyanates stated in the above paragraph with water. Further examples are likewise polyisocyanates containing urethane groups produced by reaction with polyols.

Polyisocyanate crosslinking agents known for isocyanate-curing coating systems and based on hexamethylene diisocyanate, on isophorone diisocyanate and/or on dicyclohexylmethane diisocyanate are very highly suitable as polyisocyanates. Examples are the per se known derivatives of these diisocyanates comprising biuret, urethane, uretidione and/or isocyanurate groups. Examples thereof may be found among the products known by the name Desmodure® sold by Bayer Material Science.

Examples of hydroxy carboxylic acids are hxdroxy succinic acid, 12-hydroxy stearic acid or adducts from monoepoxides and dicarboxylic acids.

All the number-average molar mass data stated in the present description are number-average molar masses determined or to be determined by gel permeation chromatography (GPC; divinylbenzene-crosslinked polystyrene as the immobile phase, tetrahydrofuran as the liquid phase, polystyrene standards).

The carboxyl-functional polyurethane resin of component B) may be produced in the presence of organic solvents, which, however, makes it necessary to isolate the polyurethane resin obtained in this manner or remove the solvent therefrom. Preferably, the production of the polyurethane resin B is, however, carried out without solvent and without subsequent purification operations.

Once the reaction carried out in the absence of solvent is complete and the reaction mixture has cooled, the solid carboxyl-functional polyurethane resin is obtained. The polyurethane assumes the form of a mixture exhibiting a molar mass distribution. The polyurethane does not require working up and may be used directly as component B).

The carboxyl-functional polyurethane resins of component B) have an acid value in the range of 50 to 300, preferably of 80 to 200.

The acid value is defined as the number of mg of potassium hydroxide (KOH) required to neutralise the carboxylic groups of 1 g of the resin.

The person skilled in the art selects the nature and proportion of the polyisocyanates and polyols for the production of polyurethane resins B) in such a manner that polyurethane resins B) are obtained which are solid at room temperature.

The hardener may be partially replaced by further hardeners useful for the curing of epoxy resins, such as, for example, hardeners containing carboxyl groups, for example, polycarboxylic acids and/or the anhydrides thereof, hardeners containing amid or amino groups, for example, dicyandiamide and the derivatives thereof, in quantities in the range of lower than 10 wt %, based on the total weight of the powder coating composition.

The powder coating composition of this invention contains 0.01 to 10 wt % of at least one wax C) selected from the group consisting of polyamide wax, polyethylene wax and zinc stearate. These are waxes, such as, for example, Ceraflour 993 and Ceraflour 990 from BYK®, Micromide 528 and MPP-230F from Micro Powders®, Lanco TPW-279, Lanco 1394 F and Lanco PE 1544 F from Lubrizol®. The waxes can have modifications, such as, being micronized or PTFE modified, and have a melting temperature in the range of, e.g., 105 to 150° C.

The powder coating composition according to the invention may contain as further components the constituents conventional in powder coating technology, such as, additives, pigments and/or fillers as known by a person skilled in the art.

Additives are, for example, degassing auxiliaries, flow-control agents, flatting agents, texturing agents, fillers (extenders), photo-initiators, catalysts, dyes. Examples are flow-control agents incorporated in the composition according to the invention via an inorganic carrier or by master-batch techniques known by a person skilled in the art. Compounds having anti-microbial activity may also be added to the powder coating compositions.

The cross-linking reaction may be additionally accelerated by the presence in the powder coating composition according to the invention of catalysts known from thermal cross-linking. Such catalysts are, for example, tin salts, phosphides, amines and amides. They may be used, for example, in quantities of 0 to 5 wt %, based on the total weight of the powder coating composition.

The powder coating composition of this invention may contain transparent, color-imparting and/or special effect-imparting pigments and/or fillers (extenders). Suitable color-imparting pigments are any conventional coating pigments of an organic or inorganic nature. Examples of inorganic or organic color-imparting pigments are titanium dioxide, micronized titanium dioxide, carbon black, azopigments, and phthalocyanine pigments. Examples of special effect-imparting pigments are metal pigments, for example, made from aluminum, copper or other metals, interference pigments, such as, metal oxide coated metal pigments and coated mica. Examples of usable extenders are silicon dioxide, aluminum silicate, barium sulfate, and calcium carbonate.

The constituents are used in conventional amounts known to the person skilled in the art, for example, 0.05 to 30 wt. %, based on the total weight of each powder coating base, preferably 0.1 to 20 wt. %.

The powder coating composition according to this invention may be prepared by conventional manufacturing techniques used in the powder coating industry, such as, extrusion and/or grinding processes, known by a person skilled in the art.

For example, the ingredients can be blended together by dry-blending methods and can be heated to a temperature to melt the mixture, and then the mixture is extruded. The extruded material is then cooled on chill roles, broken up and ground to a fine powder, which can be classified to the desired grain size, for example, to an average particle size of 20 to 200 μm.

The composition according to the invention may also be prepared by spraying from supercritical solutions, NAD "non-aqueous dispersion" processes or ultrasonic standing wave atomization process.

Furthermore, specific components of the powder coating composition according to the invention, for example, additives, pigment, fillers, may be processed with the finished powder coating particles after extrusion and grinding by a "bonding" process using an impact fusion. For this purpose, the specific components may be mixed with the powder coating particles. During blending, the individual powder coating particles are treated to softening their surface so that the components adhere to them and are homogeneously bonded with the surface of the powder coating particles. The softening of the powder particles' surface may be done by heat treating the particles to a temperature, e.g., the glass transition temperature Tg of the composition, in a range, of e.g., 50 to 60° C. After cooling the mixture the desired particle size of the resulted particles may be proceed by a sieving process.

The powder coating composition of this invention may provide powder coatings with a very low gloss.

The gloss of finishes according to this invention is measured at 60° angle according to DIN 67 530 and can be adjusted in the range of 1 to 95 gloss units. Typically, a low gloss (matt finish) has a gloss in the range of 1 to 30 gloss units. The powder coating composition of this invention may provide coatings having a gloss value of 10 gloss units and lower.

The powder coating composition of this invention may be applied by, e.g., electrostatic spraying, thermal or flame spraying, or fluidized bed coating methods, also coil coating techniques, all of which are known to those skilled in the art.

The coating composition may be applied to, e.g., metallic substrates, non-metallic substrates, such as, paper, wood, plastics, glass and ceramics, as a one-coating system or as coating layer in a multi-layer film build.

In certain applications, the substrate to be coated may be pre-heated before the application of the powder composition, and then either heated after the application of the powder or not. For example, gas is commonly used for various heating steps, but other methods, e.g., microwaves, IR or NIR are also known.

The powder coating compositions according to the invention can be applied directly on the substrate surface or on a layer of a primer which can be a liquid or a powder based primer. The powder coating compositions according to the invention can also be applied as a coating layer of a multilayer coating system based on liquid or powder coats, for example, based on a powder or liquid clear coat layer applied onto a color-imparting and/or special effect-imparting base coat layer or a pigmented one-layer powder or liquid top coat applied onto a prior coating.

The applied and melted powder coating layer can be cured by thermal energy. The coating layer may, for example, be exposed by convective, gas and/or radiant heating, e.g., infra red (IR) and/or near infra red (NIR) irradiation, as known in the art, to temperatures of, e.g., 100° C. to 300° C., preferably of 150° C. to 250° C. (object temperature in each case).

The powder coating composition can also be cured by high energy radiation known by a skilled person. UV (ultraviolet) radiation or electron beam radiation may be used as high-energy radiation. UV-radiation is preferred. Irradiation may proceed continuously or discontinuously.

Dual curing may also be used. Dual curing means a curing method of the powder coating composition according to the invention where the applied composition can be cured, e.g., both by UV irradiation and by thermal curing methods known by a skilled person.

The present invention is further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions. As a result, the present invention is not limited by the illustrative examples set forth herein below, but rather is defined by the claims contained herein below.

The following Examples illustrate the invention.

EXAMPLES

Example 1

Preparation of Carboxyl Functionalised Polyurethane Resin B)

268 parts per weight (ppw) of tri-cyclodecanedimethanol and 279 ppw of methyl ethyl ketone are filled into a reactor with interior thermometer and stirrer and heated to 75° C. 205 ppw of HDI isocyanurate (Tolonate® HDI/100, Rhone-Poulenc) are added in portions within 60 minutes keeping the temperature at 75° C. within this time period. Then the reaction mixture is heated and kept at 85-90° C. until reaching the NCO number. Afterwards the batch is cooled down to 75° C. and 248 ppw hexahydrophthalic acid anhydride are added in portions within 60 minutes keeping the temperature at 75° C. within this time period. Then the reaction mixture is heated and kept at 84-90° C. until reaching the carboxyl number of 130 mg KOH/g solid resin. Afterwards the solvent is removed by distillation at temperatures of 130-140° C. A colourless resin results having an acid value of 126 mg KOH/g solid resin, a Tg (determined by DSC) of 49-54° C. and a viscosity (125° C.) of 18 Pas.

Example 2

Manufacture of Powder Coating Compositions and Application

Powder coating compositions according to the invention (Formulation 1 and Formulation 2) are prepared according to the following ingredients:

| Formulation 1 | Weight % | Formulation 2 | Weight % |
|---|---|---|---|
| WorléeCryl ® CP 550 (glycidylfunct. acrylic resin, EEW: 510-550) | 48 | Almatex ® PD 7610 (glycidylfunct. acrylic resin, EEW: 510-560) | 48 |
| Polyurethane resin of Example 1 (hardener) | 48 | Polyurethane resin of Example 1 (hardener) | 48 |
| Byk ® 366 (flow agent) | 1.0 | Byk ® 366 (flow agent) | 1.0 |
| Benzoin | 1.0 | Benzoin | 1.0 |
| Lanco 1394 F | 2.0 | Lanco 1394 F | 2.0 |

The ingredients of each formulation are mixed and extruded in an extruder PR 46 (firm: Buss AG) at 120° C. Each melt-mixed formulation is cooled and the resulted material is grinded to a D50 value of 40 μm particle size distribution.

The final powder composition of each formulation is applied to a metal sheet by electrostatic spraying to a film thickness of 80 μm. Finally the coating is cured in a convection oven at 145° C. for 30 minutes.

Example 3

Testing of the Coatings

TABLE 1

| | Adhesion DIN EN ISO 2409 | Low Gloss DIN 67530 |
|---|---|---|
| Formulation 1 | GT 0 | 10 |
| Formulation 2 | GT 0 | 10 |

The results show a high adhesion to metal substrate surfaces and a desired very low gloss value of the coating.

What is claimed is:

1. A low gloss powder coating composition comprising
  A) 30 to 90 wt % of at least one glycidyl-functionalised (meth)acrylic resin having an epoxide equivalent weight (EEW) in a range of 300 to 2000, epoxy equivalent weight determined by means of ADSAM142 and a glass transition temperature Tg in a range of 30 to 80° C., Tg determined by means of differential scanning calorimetry (DSC),
  B) 30 to 90 wt % of at least one carboxyl functionalised polyurethane resin having an acid value in the range of 50 to 300 selected from the group consisting of a carboxyl functionalised polyurethane resin which is a reaction product of hydroxyl functionalised polyurethanes with acid anhydrides and a carboxyl functionalised polyurethane resin which is a reaction product of an isocyanate component selected from the group consisting of diisocyanates, polyisocyanates and isocyanate functionalised pre-polymers said component being reacted with hydroxyl carboxyl acids;
  C) 0.01 to 10 wt % of at least one wax selected from the group consisting of polyamide wax, polyethylene wax and zinc stearate having a melting temperature in the range of 105 to 150° C., and
  D) 0.05 to 30 wt % of at least one component selected from the group consisting of coating additive, pigment and filler
  the wt % based on the total weight of the powder coating composition and
  wherein a finish of the powder coating composition has a low gloss of 1 to 10 gloss units measured at a 60° angle according to DIN 67 530.

2. The composition according to claim 1 comprising
  A) 40 to 70 wt % of at least one glycidyl-functionalised (meth)acrylic resin,
  B) 40 to 70 wt % of at least one carboxyl functionalised polyurethane resin,
  C) 0.01 to 10 wt % of at least one wax, and
  D) 0.05 to 30 wt % of at least one component selected from the group consisting of coating additive, pigment and filler,
  the wt % based on the total weight of the powder coating composition.

3. The composition according to claim 1 wherein the glycidyl-functionalised (meth)acrylic resin A) has an epoxide equivalent weight (EEW) in a range of 400 to 800, epoxy equivalent weight determined by means of ADSAM142 and a glass transition temperature Tg in a range of 40 to 70° C., Tg determined by means of differential scanning calorimetry (DSC).

4. The composition according to claim 1 wherein the carboxyl-functional polyurethane resin B) has an acid value in the range of 80 to 200.

5. The composition according to claim 1 wherein the carboxyl functionalised polyurethane resin B) is a reaction product of hydroxyl functionalised polyurethanes with acid anhydrides.

6. The composition according to claim 1 wherein the carboxyl functionalised polyurethane resin B) is a reaction product of an isocyanate component selected from the group consisting of diisocyanates, polyisocynates and isocyanate functionalised pre-polymers with hydroxyl carboxyl acids.

7. The composition according to claim 5 wherein the hydroxyl functionalised polyurethanes are prepared by reacting polyols with polyisocyanates wherein the polyisocyanates contain functional groups selected from the group consisting of carbodiimide groups, allophanate groups, isocyanurate groups, urethane groups, acylated urea groups and biuret groups, and wherein the polyisocyanates have an isocyanate functionality higher than 2.

8. Substrate coated with the coating composition according to claim 1 and cured.

9. The substrate according to claim 8 wherein the substrate is selected from the group consisting of metallic substrates and non-metallic substrates.

10. The substrate according to claim 9 coated with a multiple coating layer.

* * * * *